US012659566B2

(12) United States Patent
Chan et al.

(10) Patent No.: US 12,659,566 B2
(45) Date of Patent: Jun. 16, 2026

(54) SYSTEM AND METHOD FOR TUNING ISP PARAMETERS

(71) Applicant: MEDIATEK INC., Hsin-Chu (TW)

(72) Inventors: Tsung-Han Chan, Hsinchu City (TW);
Yi-Hsuan Huang, Hsinchu City (TW);
Hsiao-Chien Yang, Hsinchu City (TW);
Ding-Yun Chen, Hsinchu City (TW);
Yi-Ping Liu, Hsinchu City (TW);
Chin-Yuan Tseng, Hsinchu City (TW);
Ming-Feng Tien, Hsinchu City (TW);
Shih-Hung Liu, Hsinchu City (TW);
Shuo-En Chang, Hsinchu City (TW);
Yu-Chuan Chuang, Hsinchu City
(TW); Cheng-Tsai Ho, Hsinchu City
(TW); Ying-Jui Chen, Hsinchu City
(TW); Chi-Cheng Ju, Hsinchu City
(TW)

(73) Assignee: MEDIATEK INC., Hsinchu City (TW)

( * ) Notice: Subject to any disclaimer, the term of this patent is extended or adjusted under 35 U.S.C. 154(b) by 368 days.

(21) Appl. No.: 18/201,172

(22) Filed: May 23, 2023

(65) Prior Publication Data

US 2024/0397187 A1     Nov. 28, 2024

(51) Int. Cl.
*H04N 23/60*          (2023.01)

(52) U.S. Cl.
CPC .................................. *H04N 23/60* (2023.01)

(58) Field of Classification Search
CPC .... H04N 23/60; H04N 23/617; H04N 17/002;
H04N 23/80
See application file for complete search history.

(56) References Cited

U.S. PATENT DOCUMENTS

| | | | | |
|---|---|---|---|---|
| 2017/0070671 A1 * | 3/2017 | Cho | ........................ | H04N 23/80 |
| 2019/0043209 A1 * | 2/2019 | Nishimura | ............. | H04N 23/60 |
| 2020/0389588 A1 * | 12/2020 | Sharma | ..................... | G06T 1/00 |
| 2021/0125324 A1 * | 4/2021 | Novikov | .................. | G06T 7/97 |
| 2021/0390670 A1 * | 12/2021 | Moon | ........................ | G06T 5/80 |
| 2023/0054572 A1 * | 2/2023 | Shandilya | .............. | G11B 27/34 |

* cited by examiner

*Primary Examiner* — Abdelaaziz Tissire
(74) *Attorney, Agent, or Firm* — Winston Hsu

(57) ABSTRACT

A method for tuning a plurality of image signal processor (ISP) parameters of a camera includes performing a first iteration. The first iteration includes extracting image features from an initial image, arranging a tuning order of the plurality of ISP parameters of the camera according to at least the plurality of ISP parameters and the image features, tuning a first set of the ISP parameters according to the tuning order to generate a first tuned set of the ISP parameters, and replacing the first set of the ISP parameters with the first tuned set of the ISP parameters in the plurality of ISP parameters to generate a plurality of updated ISP parameters.

19 Claims, 5 Drawing Sheets

100

Image features ——→

ISP parameters ——→ | Agent | ——→ Tuning order $\{R_1, R_2, ... R_N\}$

Camera settings ——→

SYSTEM AND METHOD FOR TUNING ISP PARAMETERS

BACKGROUND

With the rapid development of mobile devices, cameras have become increasingly important to our daily life. The cameras today often include image signal processors (ISP). Hardware ISPs are ubiquitous low-level image processing pipelines present in nearly all commodity cameras and a wide variety of applications like digital still photography, camera phones, video surveillance, robotics, driver assistance systems, and self-driving vehicles. ISPs transform raw sensor data into images suitable for human viewing or downstream analytic tasks. This transformation typically includes several processing blocks that operate power-efficiently at real-time rates, which is critical for applications in robotics or self-driving vehicles. Growing sensor resolutions mandate efficient processing pipelines in hardware. Existing ISPs typically consist of proprietary black box blocks with little information exposed to users except for a set of registers with their operational ranges. The behavior of an ISP is configurable with a set of adjustable ISP parameters. Hence, parameter tuning is essential to camera image processing and it has heavy impact on image quality. In fact, the parameter values not only affect the output image but also the domain-specific application. Traditionally, imaging experts manually tune the ISP parameters on a small dataset, using a combination of visual inspection and image quality metrics. The resulting handcrafted ISP parameters are consequently biased towards human perception, and do not necessarily benefit analytic higher-level vision tasks In modern image signal processors (ISP), there are several processing blocks, and each block can have a number of high level tunable parameters or hyperparameters. Due to the number of tunable parameters to be modified, interdependency between blocks, algorithm complexity, and thorough manual review of image quality on different images, image quality (IQ) tuning is a highly time consuming process. Furthermore, instead of global optimal solution, in most cases, only some local optima can be reached for tunable parameters with the current automatic ISP parameter tuning processes. It is a bottleneck in delivering imaging solutions to different customers. Therefore, a new automatic tuning method that can efficiently and effectively tune ISP parameters with the cameras is an urgent need of the industry.

SUMMARY

An embodiment provides a method for tuning a plurality of image signal processor (ISP) parameters of a camera. The method includes performing a first iteration. The first iteration includes extracting image features from an initial, arranging a tuning order of the plurality of ISP parameters of the camera according to at least the plurality of ISP parameters and the image features, tuning a first set of the ISP parameters according to the tuning order to generate a first tuned set of the ISP parameters, and replacing the first set of the ISP parameters with the first tuned set of the ISP parameters in the plurality of ISP parameters to generate a plurality of updated ISP parameters.

Another embodiment provides a camera including a camera tuning system and an image generating device for generating an initial image. The camera tuning system includes an agent and a parameter tuner. The agent is used to arrange a tuning order of a plurality of ISP parameters of the camera according to the plurality of ISP parameters and image features from the initial image. The parameter tuner is used to tune a set of the ISP parameters according to the tuning order to generate a tuned set of the ISP parameters, and used to replace the set of the ISP parameters with the tuned set of the ISP parameters in the plurality of ISP parameters to generate a plurality of updated ISP parameters.

These and other objectives of the present invention will no doubt become obvious to those of ordinary skill in the art after reading the following detailed description of the preferred embodiment that is illustrated in the various figures and drawings.

DETAILED DESCRIPTION

For the task of converting images by captured by a camera to color images, there is a chip in the camera called image signal processor (ISP). An image signal processor (ISP) performs the task of interpreting the optical signal that reaches the sensor and processes colors. It can also perform other functions, such as noise reduction, edge enhancement, dynamic range processing and other types of adjustments and filters. The ISP can greatly change the perception of an image. Its adjustment is a factory-based implementation or it can be upgradable by the product manufactures. It is essential that the ISP is well tuned so the camera can take good quality images. However, the combination of ISP parameters and camera settings can become unmanageable, taking weeks and even months of work by engineers to find the best values for each new product (e.g., a smartphone). Therefore, ISP tuning process is one of the bottlenecks for a smartphone to transit from the factory to the market.

The main problem with the parameter tuning of the ISP is that, in many cases, it completely involves manual labor performed by different professionals, from the image experts who analyze the image quality to the programmers who prepare and build the libraries for the camera. It is an iterative process between these professionals that usually starts by defining an appropriate scenario for the tuning and analysis. Then, the professionals start to tune the parameters starting with the factory values, such that the libraries have to be compiled and loaded onto the camera. Subsequently, the scenario is photographed by the programmers with all the different libraries that they prepared under different lighting condition to check the response of the camera. After all of the needed images are taken, the analysts give feedback and corrections. The whole process continues until there is a consensus among all the professionals, which, as previously mentioned, can take weeks to months. Therefore, the invention disclosed herein presents a camera 100 including a camera tuning system 10 for solving this long-felt problem in the industry.

Figure 1:
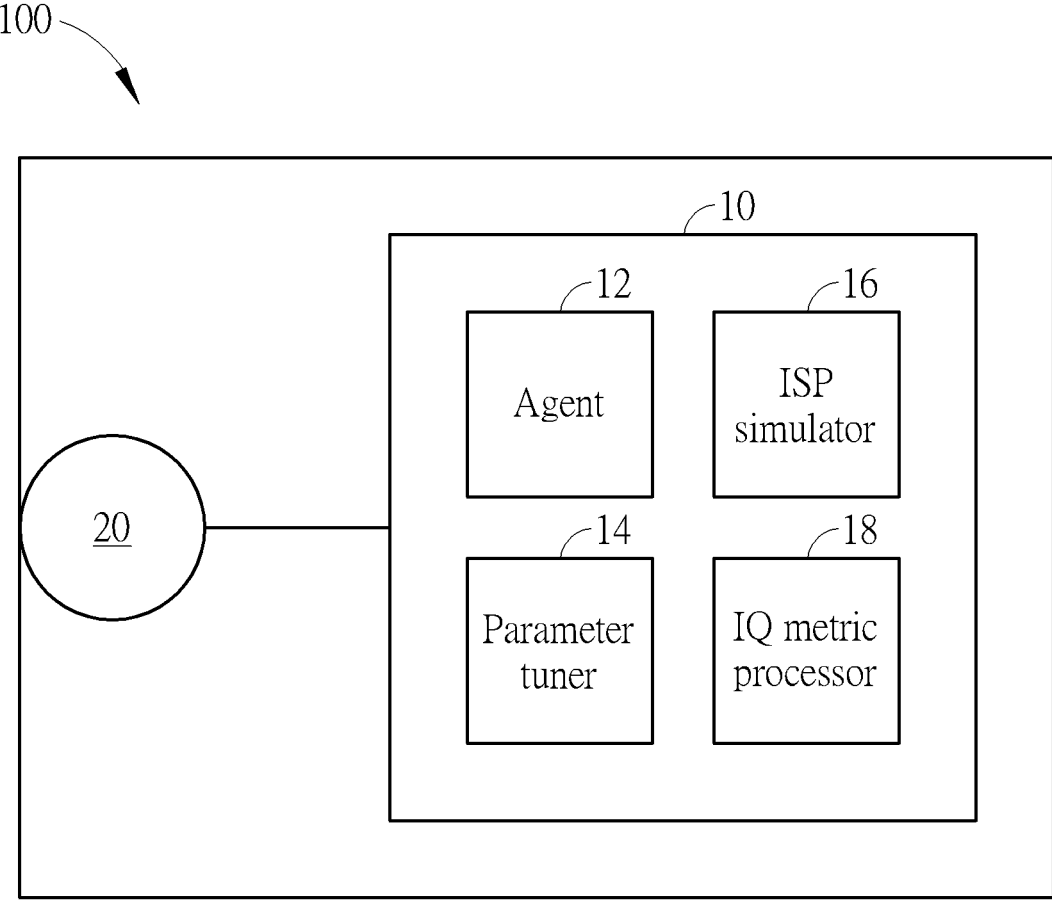
FIG. 1 is a diagram illustrating a camera of an embodiment.

FIG. 1 is a diagram illustrating a camera 100 of an embodiment. The camera 100 includes a camera tuning system 10 and an image generating device 20 coupled to the camera tuning system 10 for generating an initial image. In an embodiment, the image generating device 20 can be an image capturing device with a built-in lens and an optical sensor for capturing an optical signal and generating an initial image. The image generating device 20 can also be a simulator that generates a simulated initial image. The camera tuning system 10 can be an image signal processor (ISP) of various configurations including many functional blocks. An ISP is composed of various blocks to reconstruct image sensor raw data to final image consumed by human visual system or computer vision applications. A basic ISP pipeline may include functional blocks such as Bayer noise reduction, demosaic, YUV noise reduction, sharpening, edge enhancement and contrast enhancement, etc. Hardware implementation of the ISP is usually in the form of semiconductor chips.

In an embodiment, the camera tuning system 10 includes an agent 12, a parameter tuner 14, an ISP simulator 16 and an image quality (IQ) metric processor 18. The agent 12 can be a machine learning model and/or a handcrafted algorithm manually engineered by the developers. If the agent 12 is a machine learning model, it can be trained by supervised learning (e.g., support-vector machines and neural networks, etc.), unsupervised learning (e.g., clustering analysis and neural networks, etc.) or reinforcement learning (e.g., actor-critic and neural networks, etc.). The parameter tuner 14 can be an automatic tuning system and the ISP simulator 16 can be a software implementation or a hardware device such as a smartphone. The IQ metric processor 18 can either be a handcrafted algorithm such as signal-to-noise ratio or an artificial intelligence (AI) model such as a machine learning model.

The disclosure presents a method of the tuning ISP parameter by machine in order to approach the global optimal solution for the ISP parameters with least amount of time.

The camera tuning problem can be formalized in mathematical expression:

$$\max_{\Theta \in C} \mathcal{L}(ISP(\Theta)) \tag{1}$$

$\Theta = \{R_1, R_2, \ldots R_N\}$ denotes the set of parameters, and N is the number of parameters. $ISP(\Theta)$ is the output image from the ISP simulator 16. $\mathcal{L}$ represents the IQ index, assuming the larger the better. $c$ indicates a constrain set of the ISP parameters.

Searching a global optimal solution of problem (1) is practically difficult, because the number of parameters N is in the order of hundreds and the functions in ISP are usually non-linear, making optimizing over the complete set of ISP parameters jointly very time consuming. To overcome this issue, one method is to divide the set of ISP parameters $R_1$, $R_2, \ldots R_N$ into several groups and optimize them one-by-one, as specified by the following operation:

$$R_1^* = \arg_{R_1 \in C_1} \max \mathcal{L}(ISP(R_1, \hat{R}_2, \ldots \hat{R}_N)) \tag{2a}$$

$$R_2^* = \arg_{R_2 \in C_2} \max \mathcal{L}(ISP(R_1^*, R_2, \ldots \hat{R}_N)) \tag{2b}$$

$$\vdots$$

$$R_N^* = \arg_{R_N \in C_N} \max \mathcal{L}(ISP(R_1^*, R_2^*, \ldots R_N)) \tag{2c}$$

Problem (2a) aims to find the optimal solution of $R_1$ under the constraint $C_1$, denoted by $R^*_1$, with other parameters $\hat{R}_2, \ldots \hat{R}_N$ fixed. The $R^*_1$ would then be fed into the Problem (2b) to find the next optimal solution $R_2$ in (2b). Accordingly, as illustrated in Problem (2c), the $N^{th}$ optimal solution $R^*_N$ could be found by the previous N−1 optimal solutions $R^*_1$, $R^*_2$, $\ldots R^*_{N-1}$. This process refers to successive optimization of Problem (1) and the solution found $\{R^*_1, R^*_2, \ldots R^*_N\}$ is suboptimal. Hence, the solving order of Problems (2a)-(2c) can result in different solutions which affect the optimality and the image quality.

In this disclosure, some embodiments of the method to find the best tuning order to approach the global optimal solution of the ISP parameters are presented in the following paragraphs.

Figure 2:
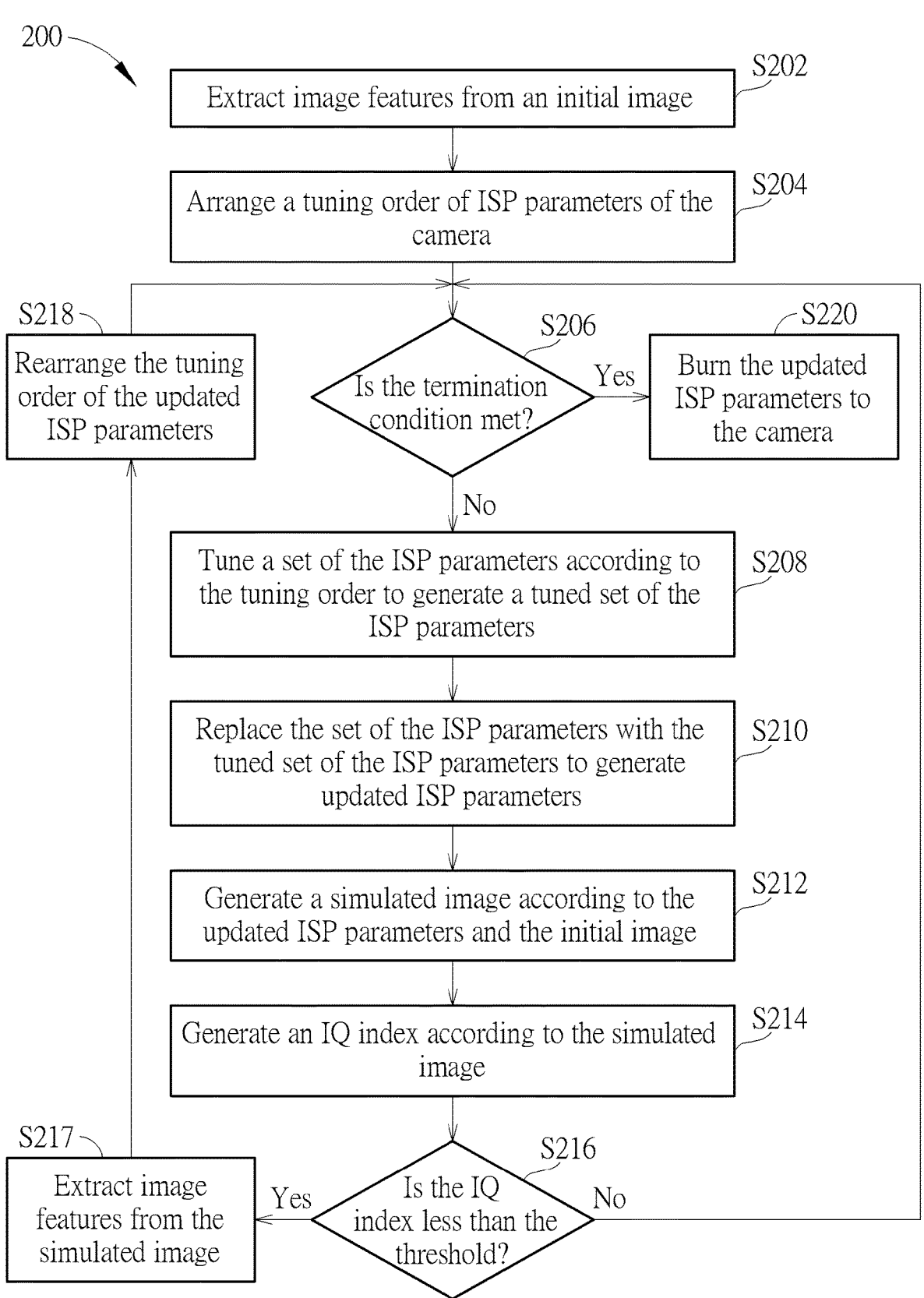
FIG. 2 is a flowchart of a method for tuning the ISP parameters of the camera in FIG. 1.

FIG. 2 is a flowchart of a method 200 for tuning the ISP parameters of the camera 100. The method 200 includes the following steps:

S202: Extract image features from an initial image;

S204: Arrange a tuning order of ISP parameters of the camera 100 according to the ISP parameters, the image features and camera settings;

S206: Is the termination condition met? If yes, proceed to S220; if no, proceed to step S208;

S208: Tune a set of the ISP parameters according to the tuning order to generate a tuned set of the ISP parameters;

S210: Replace the set of the ISP parameters with the tuned set of the ISP parameters to generate updated ISP parameters;

S212: Generate a simulated image according to the updated ISP parameters and the initial image;

S214: Generate an image quality (IQ) index according to the simulated image;

S216: Is the IQ index less than the threshold? If yes, proceed to S217; if no, go back to S206;

S217: Extract image features from the simulated image;

S218: Rearrange the tuning order of the updated ISP parameters excluding the tuned set of the ISP parameters; proceed to S206;

S220: Burn the updated ISP parameters to the camera 100.

Figure 3:
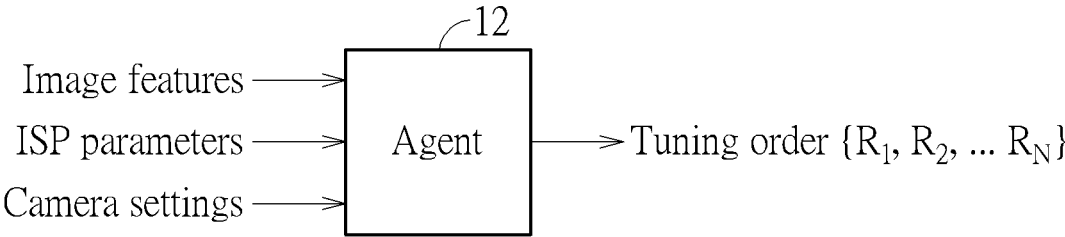
FIG. 3 is a diagram illustrating the agent in FIG. 1 arranging the tuning order of the ISP parameters.

The initial image can be generated by camera capturing or computer simulation. The image feature can be extracted by an artificial intelligence (AI) model or a handcrafted algorithm in step S202. FIG. 3 is a diagram illustrating the agent 12 arranging the tuning order of the ISP parameters. In step S204, the agent 12 arranges the tuning order of the ISP parameters, e.g., $\{R_1, R_2, \ldots R_N\}$, according to the values of ISP parameters, the image features and camera settings. The ISP parameters and the camera settings can be predetermined by engineers. The camera settings may include ISO speed, exposure index, light value and/or dynamic range.

In detail, the agent 12 can output the probability of the actions and the action with maximum probability leads to maximum future reward. The observation or the input of the agent 12 would be image features, ISP parameters and camera settings. The tuning order can then be determined by sorting the probability of the actions. The agent 12 can also call an action of stop, of which the tuning can be early terminated without requiring tuning all the ISP parameters. Furthermore, the agent 12 can memorize the ISP parameters that have been tuned and rearrange the tuning order excluding the tuned ISP parameters.

The parameter tuner 14 aims to find ISP parameters that maximize the image quality (IQ index). In some embodiments, the parameter tuner 14 can be an optimizer that optimizes the ISP parameters. In step S208, the parameter tuner 14 tunes the ISP parameter $R_1$ to produce the tuned ISP parameter $R_1^*$. Thus, in step S210, the updated set of ISP parameters would be $\{R^*_1, R_2, \ldots R_N\}$, where $\{R_2, \ldots R_N\}$ indicates the set of untuned parameters. In step S212, the ISP simulator 16 converts the initial image to a simulated color image with the updated ISP parameters $\{R^*_1, R_2, \ldots R_N\}$. Then, in step S214, the IQ metric processor 18 computes an IQ index from the simulated color image. The IQ index reflects an application-specific image quality of the simulated color image. It is a linear or nonlinear function of metric scores of noise, texture, artifact, tone, contrast, dynamic range, color, brightness and/or temporal quality. In detail, noise can include SNR (signal to noise ratio), STD (standard deviation) or a combination thereof. Texture can include SFR (spatial frequency response), MTF (modulation transfer function), or a combination thereof. Also, the IQ index can be used as a reward for training the agent 12 by reinforcement learning.

If the IQ index is greater than or equal to the threshold (S216), the camera tuning system 10 would start the next iteration with the parameter tuner 14 tuning the ISP parameter $R_2$. Then, the set of ISP parameters can be updated to $\{R^*_1, R^*_2, \ldots R_N\}$. Similar to the previous iteration, the ISP simulator 16 can then convert the initial image to a simulated color image with the updated ISP parameters $\{R^*_1, R^*_2, \ldots R_N\}$ and the IQ metric processor 18 computes an IQ index from the simulated color image.

However, if IQ index is less than the threshold (S216), it means the tuning order can be further optimized. At this point (S218), the camera tuning system 10 would call the agent 12 again to rearrange the tuning order of the ISP parameters excluding ISP parameter $R_1^*$. That is, in the next iteration, the tuning order may be, for example, $\{R_4, R_2, R_5 \ldots R_N\}$.

It should be noted that, when the agent 12 is called to rearrange the tuning order of the ISP parameters, the set of ISP parameters $\{R^*_1, R_2, \ldots R_N\}$ would be different from the set of ISP parameters $\{R_1, R_2, \ldots R_N\}$ of the previously iteration; the image features also would be different from that of the previous iteration. Thus, the agent 12 can generate a new tuning order accordingly.

Next, the parameter tuner 14 can tune the ISP parameter $R_4$ to produce the tuned ISP parameter $R_4^*$. Then, the set of ISP parameters can be updated to $\{R^*_1, R^*_4, R_2 \ldots R_N\}$. Similar to the previous iteration, the ISP simulator 16 can then convert the initial image to a simulated color image with the updated ISP parameters $\{R_1, R^*_4, R_2 \ldots R_N\}$ and the IQ metric processor 18 computes an IQ index from the simulated color image.

Furthermore, the agent 12 can determine whether the termination condition is met in step S206. For example, if according to image features, the ISP parameters and the camera settings, the agent 12 determines that further tuning is unlikely to yield better IQ index (e.g., the IQ index does not change after tuning), the agent 12 would call a STOP action to terminate the iterations. Then, the camera tuning system 10 would burn the updated ISP parameters, for example, $\{R^*_1, R^*_4, R^*_2 \ldots R^*_N\}$ to the camera 100, thus completing the method 200 for tuning the ISP parameters. For persons skilled in the art, the term "burn" in this context means an action that makes the ISP parameters take effect in a device associated with the camera. For example, the device in which the ISP parameters take effect could be a smartphone or a digital camera. In some embodiments, when the STOP action is called, a tuning expert is notified to check whether the updated ISP parameters are appropriate. In some embodiments, the parameter tuner 14 may interpolate or extrapolate the updated ISP parameters and the original ISP parameters to produce several sets of updated ISP parameters for the tuning expert to choose the most appropriate set of updated ISP parameters.

Figure 4:
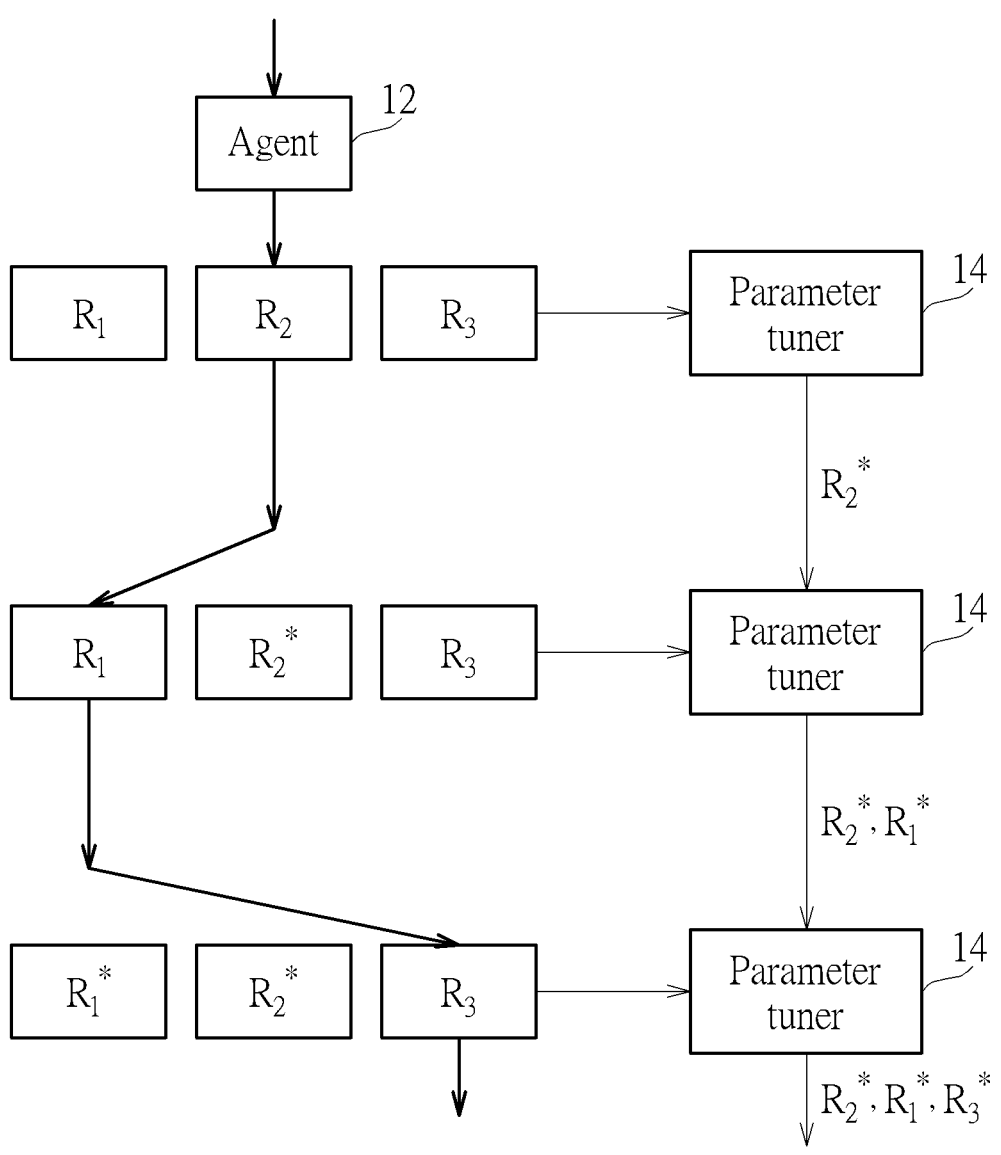
FIG. 4 is a diagram illustrating a tuning process of an embodiment of the method in FIG. 2.

FIG. 4 is a diagram illustrating a tuning process of an embodiment of the method 200. In this embodiment, the agent 12 is called in the beginning of tuning process. The tuning order of the ISP parameters is arranged by the agent 12 as $\{R_2, R_1, R_3 \ldots \}$. Then, the parameter tuner 14 can tune ISP parameters in this order during the iterations to produce the tuned ISP parameters $\{R^*_2, R^*_1, R^*_3 \ldots \}$. This may happen in a scenario which during the tuning process, the computed IQ index is higher than the threshold at each iteration. Thus, there is no need to call the agent 12 again to rearrange the tuning order of the ISP parameters. The tuning process can continue for each iteration until finishing tuning the last ISP parameter or being terminated by the agent 12.

Figure 5:
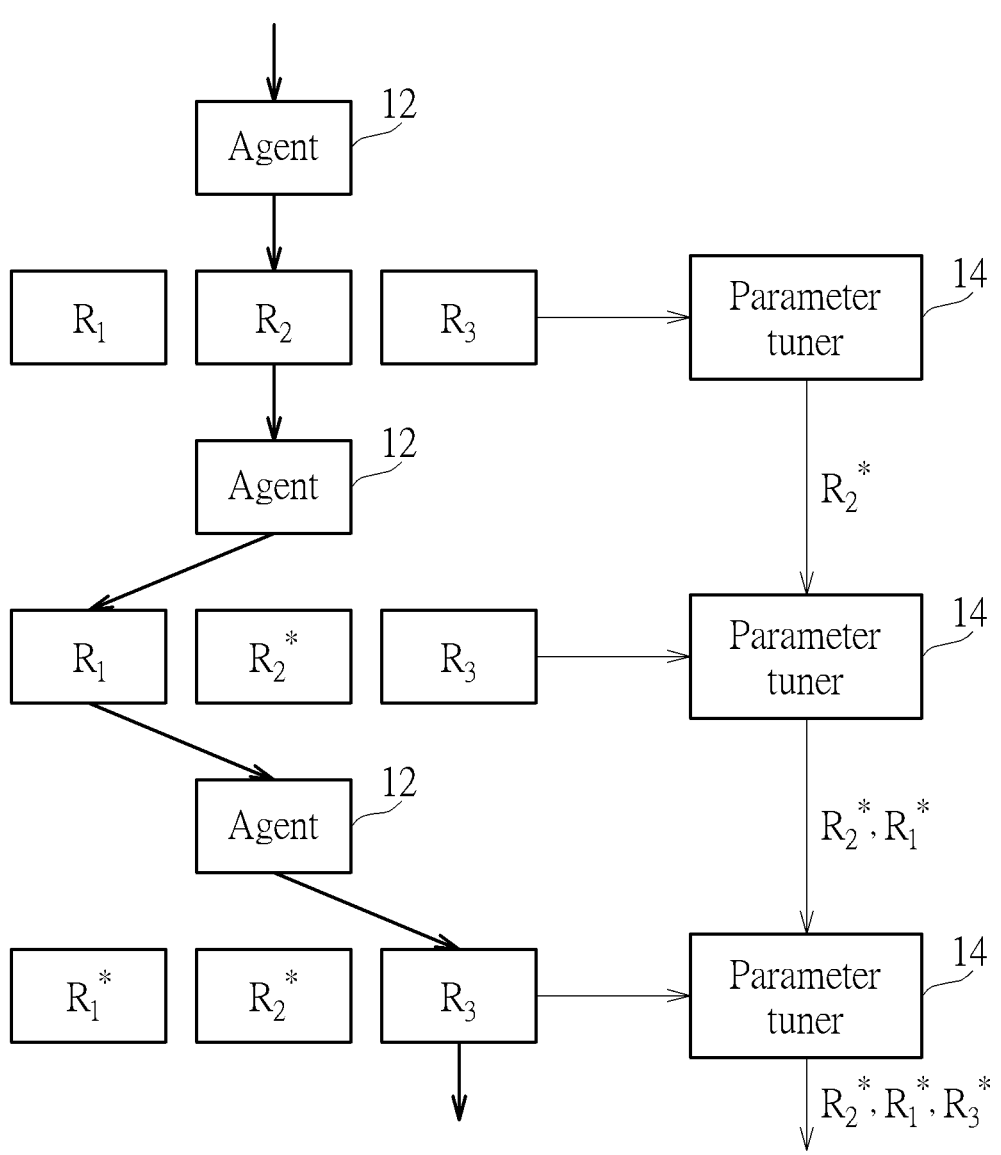
FIG. 5 is a diagram illustrating a tuning process of another embodiment of the method in FIG. 2.

FIG. 5 is a diagram illustrating a tuning process of another embodiment of the method 200. In this embodiment, the agent 12 is called at each iteration of tuning process. This may be the scenario which during the tuning process, the computed IQ index is lower than the threshold at each iteration, so the computer tuning system 10 seeks more aggressive tuning strategy. Firstly, the agent 12 arranges the tuning order of the ISP parameters to be $\{R_2, \ldots \}$. Then, the parameter tuner 14 can tune the ISP parameter $R_2$ to produce the tuned ISP parameter $R_2^*$. At the next iteration, the agent 12 arranges the tuning order to be $\{R^*_2, R_1 \ldots \}$. Because the ISP parameter $R_2^*$ is already tuned, at this iteration the parameter tuner 14 tunes the ISP parameter $R_1$ to produce the tuned ISP parameter $R_1^*$. At the next iteration, the agent 12 arranges the tuning order to be $\{R^*_2, R^*_1, R_3 \ldots \}$. Because the ISP parameter $R_2^*$ and $R_1^*$ are already tuned, at this iteration the parameter tuner 14 tunes the ISP parameter $R_3$ to produce the tuned ISP parameter $R_3^*$ and so on so forth. The tuning process can continue until finishing tuning the last ISP parameter or being terminated by the agent 12.

It should be noted that the invention is not limited to tuning one ISP parameter (e.g., $\{R_1\}$) at each iteration. Tuning a plurality of ISP parameters (e.g., $\{R_1, R_2, R_3\}$) at each iteration can be easily implemented with the parameter tuner 14 by persons skilled in the art. Thus, the invention is not limited thereto.

The various embodiments of the system and method for tuning image signal processor parameters presented in this disclosure can automatically and rapidly tune the ISP parameters with less need for human experts to review image quality. Furthermore, the tuned ISP parameters can be very close to the global optimal solution. As a result, the technical method disclosed by the present invention overcomes the bottleneck in delivering imaging solutions to customers.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for tuning a plurality of image signal processor (ISP) parameters of a camera, the method comprising performing a first iteration, the first iteration comprising:

extracting image features from an initial image;

arranging a tuning order of the plurality of ISP parameters of the camera according to at least the plurality of ISP parameters and the image features;

tuning a first set of the ISP parameters according to the tuning order to generate a first tuned set of the ISP parameters;

replacing the first set of the ISP parameters with the first tuned set of the ISP parameters in the plurality of ISP parameters to generate a plurality of updated ISP parameters; and performing a new iteration, the new iteration comprising:

arranging a tuning order of untuned ISP parameters of the updated ISP parameters according to the updated ISP parameters and image features extracted from an image simulated by the updated ISP parameters;

tuning a new set of the ISP parameters selected from untuned ISP parameters in the plurality of previously updated ISP parameters according to the tuning order of the untuned ISP parameters to generate a new tuned set of the ISP parameters; and replacing the new set of the ISP parameters with the new tuned set of the ISP parameters in the plurality of previously updated ISP parameters to generate a plurality of newly updated ISP parameters.

2. The method of claim 1 further comprising performing a new iteration, the new iteration comprising:

tuning a new set of the ISP parameters selected from untuned ISP parameters in the plurality of previously updated ISP parameters according to the tuning order of the plurality of ISP parameters to generate a new tuned set of the ISP parameters; and replacing the new set of the ISP parameters with the new tuned set of the ISP parameters in the plurality of previously updated ISP parameters to generate a plurality of newly updated ISP parameters.

3. The method of claim 1, wherein the tuning order of the plurality of ISP parameters of the camera is arranged according to the plurality of ISP parameters, the image features, and camera settings.

4. The method of claim 3, wherein the camera settings comprise ISO speed, exposure index, light value and/or dynamic range.

5. The method of claim 1 further comprising if a termination condition is met, burning the plurality of newly updated ISP parameters to the camera.

6. The method of claim 1, wherein the image features are extracted from the initial image by a machine learning model or a handcrafted algorithm.

7. The method of claim 1 further comprising:

generating a simulated image according to the newly updated ISP parameters and the initial image; and generating an image quality (IQ) index according to the simulated image.

8. The method of claim 7 further comprising:

determining whether to arrange a tuning order of untuned ISP parameters of the plurality of newly updated ISP parameters according to the IQ index.

9. The method of claim 8, further comprising determining to arrange a tuning order of a plurality of untuned ISP parameters of the plurality of newly updated ISP parameters if the IQ index is less or larger than a threshold.

10. The method of claim 7, wherein the IQ index is a function of metric scores of noise, texture, artifact, tone, contrast, dynamic range, color, brightness and/or temporal quality.

11. The method of claim 1, wherein the initial image is generated by camera capturing or computer simulation.

9

10

12. A camera comprising:

an image generating device configured to generate an initial image; and a camera tuning system comprising:

an agent configured to:

arrange a tuning order of a plurality of ISP parameters of the camera according to the plurality of ISP parameters and image features from the initial image; and arrange a tuning order of untuned ISP parameters of updated ISP parameters according to the updated ISP parameters and image features extracted from an image simulated by the updated ISP parameters; and a parameter tuner configured to;

tune a set of the ISP parameters according to the tuning order to generate a tuned set of the ISP parameters;

replace the set of the ISP parameters with the tuned set of the ISP parameters in the plurality of ISP parameters to generate a plurality of updated ISP parameters;

tune a new set of the ISP parameters selected from untuned ISP parameters in the plurality of previously updated ISP parameters according to the tuning order of the untuned ISP parameters to generate a new tuned set of the ISP parameters; and replace the new set of the ISP parameters with the new tuned set of the ISP parameters in the plurality of previously updated ISP parameters to generate a plurality of newly updated ISP parameters.

13. The camera of claim 12, wherein the camera tuning system further comprises:

an image simulator configured to generate a simulated image according to the updated ISP parameters and the initial image; and an image quality (IQ) metric processor generating an IQ index according to the simulated image;

wherein whether to arrange a tuning order of untuned ISP parameters of the plurality of updated ISP parameters is determined according to the IQ index.

14. The camera of claim 13, wherein the IQ index is a function of metric scores of noise, texture, artifact, tone, contrast, dynamic range, color, brightness and/or temporal quality.

15. The camera of claim 12, wherein the agent is a machine learning model and/or a handcrafted algorithm.

16. The camera of claim 15, wherein the machine learning model is trained by supervised learning, unsupervised learning or reinforcement learning.

17. The camera of claim 12, wherein the agent arrange the tuning order of the plurality of ISP parameters of the camera according to the plurality of ISP parameters, image features and camera settings.

18. The camera of claim 17, wherein the camera settings comprise ISO speed, exposure index, light value and/or dynamic range.

19. The camera of claim 12, wherein the image generating device is an image capturing device or an image simulator.

* * * * *